United States Patent
Tucci (10) Patent No.: US 8,612,499 B1
(45) Date of Patent: Dec. 17, 2013

(54) METHOD FOR EVALUATING QUANTUM OPERATOR AVERAGES

(76) Inventor: Robert R. Tucci, Woburn, MA (US)

( * ) Notice: Subject to any disclaimer, the term of this patent is extended or adjusted under 35 U.S.C. 154(b) by 598 days.

(21) Appl. No.: 12/925,867

(22) Filed: Nov. 1, 2010

(51) Int. Cl.
*G06F 7/00* (2006.01)
*G06F 15/00* (2006.01)

(52) U.S. Cl.
USPC .......................................... 708/200; 708/403

(58) Field of Classification Search
USPC ................................................ 708/200, 403
See application file for complete search history.

(56) References Cited

U.S. PATENT DOCUMENTS

| | | | | |
|---|---|---|---|---|
| 6,472,681 B1 * | 10/2002 | Kane | ................................ | 257/14 |
| 7,451,292 B2 * | 11/2008 | Routt | ............................... | 712/14 |
| RE41,900 E * | 10/2010 | Tucci | ............................... | 706/52 |
| 2003/0169041 A1 * | 9/2003 | Coury et al. | .................. | 324/307 |
| 2004/0078421 A1 * | 4/2004 | Routt | ............................ | 709/201 |
| 2007/0162262 A1 * | 7/2007 | Tucci | ................................ | 703/1 |

OTHER PUBLICATIONS

John P. Hayes, Igor L. Markov, Quantum Approaches to Logic Circuit Synthesis and Testing, University of Michigan, 2006, pp. 1-61.*
Rajagopal Nagarajan, Nikolaos Papanikolaou, David Williams, Simulating and Compiling Code for the Sequential Quantum Random Access Machine, 2005, University of Warwick, pp. 1-9.*
Vivek V. Shende, Stephen S. Bullock. Igor L. Markov, Synthesis of Quantum Logic Circuits, The University of Michigan and NIST, 2006, pp. 1-19.*
A. W. Harrow, A. Hassidim, S. Lloyd, "Quantum algorithm for solving linear systems of equations", arXiv:0811.3171v3.
A.M. Childs, "On the relationship between continuous- and discrete-time quantum walk", arXiv:0810.0312.
S. K. Leyton, T. J. Osborne, "A quantum algorithm to solve nonlinear differential equations", arXiv:0812.4423.
L. Sheridan, D. Maslov, M. Mosca, "Approximating Fractional Time Quantum Evolution", arXiv:0810.3843.
P. Wocjan, C. Chiang, A. Abeyesinghe, D. Nagaj, "Quantum Speed-up for Approximating Partition Functions", arXiv:0811.0596.
D. Poulin, P. Wocjan, "Sampling from the thermal quantum Gibbs state and evaluating partition functions with a quantum computer", arXiv:0905.2199.
K. Temme, T.J. Osborne, K.G. Vollbrecht, D. Poulin, F. Verstraete, "Quantum Metropolis Sampling", arXiv:0911.3635.
R.R. Tucci, "Code Generator for Quantum Simulated Annealing", arXiv:0908.1633.
R.R. Tucci, "Oracular Approximation of Quantum Multiplexors and Diagonal Unitary Matrices", arXiv:0901.3851.
R.R. Tucci, "Quantum Compiling with Approximation of Multiplexors", arXiv:quant-ph/0412072.
A.Yu.Kitaev, "Quantum measurements and the Abelian Stabilizer Problem", quant-ph/9511026.
R.R. Tucci, "Use of Quantum Sampling to Calculate Mean Values of Observables and Partition Function of a Quantum System", arXiv:0912.4402.
R.R. Tucci, "QOperAv, a Code Generator for Generating Quantum Circuits for Evaluating Certain Quantum Operator Averages", arXiv:1010.4926.
http://en.wikipedia.org/wiki/WinBugs.
R.R. Tucci "Quibbs, a Code Generator for Quantum Gibbs Sampling", arXiv:1004.2205.

* cited by examiner

*Primary Examiner* — Chat Do
*Assistant Examiner* — Kevin G Hughes

(57) ABSTRACT

We describe a method for using a classical computer to generate a sequence of elementary operations (SEO) that can be used to operate a quantum computer. A quantum computer operating under such a SEO can be used to evaluate certain quantum operator averages.

20 Claims, 6 Drawing Sheets

$$\mu(x_0) \stackrel{def}{=} \langle x_0 | V^\dagger f(A) V | x_0 \rangle \quad 202$$

$$\mu(x_0) = \frac{1}{\gamma N_{sam}} \sum_{s=1}^{N_{sam}} \delta_0^{b^{(s)}} \quad 203$$

$$R_j = \begin{bmatrix} c_j & -s_j \\ s_j & c_j \end{bmatrix} \qquad 402$$

$$c_j = \sqrt{\gamma f\left(\frac{2\pi j}{\Delta t\, N_{S\underline{j}}}\right)} \qquad 403$$

$$s_j = \sqrt{1 - c_j^2} \qquad 404$$

$\langle y| U_\Omega | x \rangle = \langle y| \hat{\Omega} = \Omega_x \rangle$, $Z = \text{tr}(e^{-\beta H})$  601

(a)

$$V = U_\Omega, \quad A = \rho, \quad f(\xi) = \xi \qquad 602$$

$$\mu(x) = \langle x | U_\Omega^\dagger \rho U_\Omega | x \rangle \qquad 603$$

$$\text{tr}(\Omega \rho) = \frac{1}{N_{sam}} \sum_{s=1}^{N_{sam}} \Omega_{x^{(s)}} \qquad 604$$

(b)

$$V = U_\Omega, \quad A = H, \quad f(\xi) = e^{-\beta \xi} \qquad 605$$

$$\mu(x) = \langle x | U_\Omega^\dagger e^{-\beta H} U_\Omega | x \rangle \qquad 606$$

$$\text{tr}(\Omega \rho) = \frac{1}{N_{sam}} \sum_{s=1}^{N_{sam}} \Omega_{x^{(s)}}, \text{ where } \rho = \frac{e^{-\beta H}}{Z} \qquad 607$$

(c)

$$V = 1, \quad A = H, \quad f(\xi) = e^{-\beta \xi} \qquad 608$$

$$\mu(x) = \langle x | e^{-\beta H} | x \rangle \qquad 609$$

$$\check{P}(x) = \frac{1}{N_{sam}} \sum_{s=1}^{N_{sam}} \delta_x^{x^{(s)}}, \quad \check{Z} = \frac{1}{N_{sam}} \sum_{s=1}^{N_{sam}} \frac{\mu(x^{(s)})}{\check{P}(x^{(s)})} \approx Z$$

610　　　　　　　　611

US 8,612,499 B1

METHOD FOR EVALUATING QUANTUM OPERATOR AVERAGES

CROSS REFERENCES TO RELATED APPLICATIONS

Not Applicable

STATEMENT REGARDING FEDERALLY SPONSORED RESEARCH AND DEVELOPMENT

Not Applicable

REFERENCE TO COMPUTER PROGRAM LISTING

A computer program listing appendix contained in a single compact disc (CD) is included herewith and incorporated by reference herein. The CD is in IBM-PC format and was burned with a computer running the Windows 98 operating system. The CD contains a single file titled QOperAv1-5.txt, in ASCII format, of size 542 KBytes, burnt onto the CD on Oct. 31, 2010.

BACKGROUND OF THE INVENTION (A) Field of the Invention

The invention relates to a quantum computer; that is, an array of quantum bits (called qubits). More specifically, it relates to methods for using a classical computer to generate a sequence of operations that can be used to operate a quantum computer.

(B) Description of Related Art

Henceforth, we will allude to certain references by codes. Here is a list of codes and the references they will stand for.

Ref.Har is A. W. Harrow, A. Hassidim, S. Lloyd, "Quantum algorithm for solving linear systems of equations", arXiv:0811.3171v3

Ref.Chi is A. M. Childs, "On the relationship between continuous- and discrete-time quantum walk", arXiv:0810.0312

Ref.Ley is S. K. Leyton, T. J. Osborne, "A quantum algorithm to solve nonlinear differential equations", arXiv:0812.4423

Ref.She is L. Sheridan, D. Maslov, M. Mosca, "Approximating Fractional Time Quantum Evolution", arXiv:0810.3843

Ref.Woc is P. Wocjan, C. Chiang, A. Abeyesinghe, D. Nagaj, "Quantum Speed-up for Approximating Partition Functions", arXiv:0811.0596

Ref.Pou is D. Poulin, P. Wocjan, "Sampling from the thermal quantum Gibbs state and evaluating partition functions with a quantum computer", arXiv:0905.2199

Ref.Tem is K. Temme, T. J. Osborne, K. G. Vollbrecht, D. Poulin, F. Verstraete, "Quantum Metropolis Sampling", arXiv:0911.3635

Ref.TucQusann is R. R. Tucci, "Code Generator for Quantum Simulated Annealing", arXiv:0908.1633

Ref.TucOrApprox is R. R. Tucci, "Oracular Approximation of Quantum Multiplexors and Diagonal Unitary Matrices", arXiv:0901.3851

Ref.TucExact is R. R. Tucci, "Quantum Compiling with Approximation of Multiplexors", arXiv:quant-ph/0412072

Ref.Kit is A. Yu. Kitaev, "Quantum measurements and the Abelian Stabilizer Problem", quant-ph/9511026

Ref.TucZ is R. R. Tucci "Use of Quantum Sampling to Calculate Mean Values of Observables and Partition Function of a Quantum System", arXiv:0912.4402

Ref.TucQOA is R. R. Tucci, "QOperAv, a Code Generator for Generating Quantum Circuits for Evaluating Certain Quantum Operator Averages", arXiv:1010.4926

Ref.WikiWBugs is http://en.wikipedia.org/wiki/WinBugs

Ref.TucQuibbs is R. R. Tucci "Quibbs, a Code Generator for Quantum Gibbs Sampling", arXiv:1004.2205

This invention deals with quantum computing. A quantum computer is an array of quantum bits (qubits) together with some hardware for manipulating those qubits. Quantum computers with several hundred qubits have not been built yet. However, once they are built, it is expected that they will perform certain calculations much faster that classical computers. A quantum computer follows a sequence of elementary operations. The operations are elementary in the sense that they act on only a few qubits (usually 1, 2 or 3) at a time. Henceforth, we will sometimes refer to sequences as products and to operations as operators, matrices, instructions, steps or gates. Furthermore, we will abbreviate the phrase "sequence of elementary operations" by "SEO" SEOs for quantum computers are often represented by quantum circuits. In the quantum computing literature, the term "quantum algorithm" usually means a SEO for quantum computers for performing a desired calculation. Some quantum algorithms have become standard, such as those due to Deutsch-Jozsa, Shor and Grover. One can find on the Internet many excellent expositions on quantum computing.

The quantum circuits that form part of this invention resemble those proposed prior to this invention in Ref.Har. Most of Ref.Har is preoccupied with encoding the solution of a system of linear equations into the amplitude of a quantum state. Only at the end (just before Appendix A, on page 5 of Version 3 of Ref.Har) do we find the following statement:

"Perhaps the most far-reaching generalization of the matrix inversion algorithm is not to invert matrices at all! Instead, it can compute $f(A)|b\rangle$ for any computable $f$. Depending on the degree of nonlinearity of $f$, non-trivial tradeoffs between accuracy and efficiency arise. Some variants of this idea are considered in [4, 12, 20]."

To date, the authors of Ref.Har have not published in arXiv any follow-up papers developing further the idea expressed in the above quote.

The following are some novel features of this invention over Ref.Har.

1. (different use) This invention is not used for solving systems of linear equations, so most of Ref.Har is irrelevant to this patent.

2. (lacks important details) The above quote from Ref.Har lacks important details. For example, it does not specify the nature of $|b\rangle$ or how it should be created, or what types of expected values would be of particular interest and why.

3. (no V) The circuit 201 of FIG. 2 starts the atom qubits in a tensor product state $|x\rangle$ and applies a circuit V to them. The circuit of Ref.Har has no operator that is a clear counterpart to V. Adding an operator V might seem trivial, but it is of much practical utility, for instance, in scenarios (a) and (b) of FIG. 6, where V equals a "basis-changer" unitary matrix $U_\Omega$, where $\Omega$ is a Hermitian operator whose expected value we seek.

4. (no multiplexor SEO) Ref.Har does not explain how the operator (what we call a "quantum multiplexor" in this patent) between times 3 and 4 in circuit 201 of FIG. 2 can be expanded into a SEO. By "SEO" we mean a sequence of elementary operations, and by "elementary operations" we mean operations that act on a few (usually 1, 2 or 3) qubits. In comparison, this invention explains very explicitly how to expand multiplexors into a SEO. In fact, this patent includes source code for a computer application called Multiplexor Expander that can expand multiplexors into a SEO in two different ways: an exact expansion and an oracular approximation expansion. The computer application Multiplexor Expander is explained in Ref.QuSann. The theoretical underpinnings of the oracular approximation expansion are explained in Ref.TucOrApprox. There are many possible ways of expanding a quantum multiplexor into an exact SEO. The type of exact expansion that the application Multiplexor Expander gives is explained in Ref.TucExact. This type of exact expansion is notable because it uses a low number of elementary operations compared with other possible exact expansions. It uses only 1-qubit and 2-qubit elementary operations, and a number of 2-qubit operations less than $2^c+1$, where c is the number of controls of the multiplexor.

5. (no machine) Ref.Har presents its algorithm in a very abstract way, divorced from any machine or computer program to implement it. Ref.Har gives no instructions on how to automate its algorithm, nor does it mention the huge benefits of doing so. This invention, on the other hand, is all about automating quantum circuit generation. It's like the difference between drawing cartoons by hand, and writing computer software that can produce a Pixar movie. Surely those who created software automating cartoon drawing invented something new beyond what hand painters of cartoons did.

References 4, 12, 20 mentioned in the above quote are Ref.Chi, Ref.Ley, and Ref.She. These references use circuits that are significantly different from those used in this invention, and their circuits are used with a different purpose in mind. Furthermore, just like Ref.Har, they do not give an explicit SEO expansion of quantum multiplexor operators.

As is common practice, we will refer to $Z=tr(e^{-\beta H})$ for some real parameter $\beta$ and a Hermitian operator H, as a partition function. Evaluating partition functions is of much interest in physics and chemistry. Prior to Ref.TucZ, various methods had been proposed for calculating partition functions using a quantum computer. The most notable work in this regard is Ref.Woc, Ref.Pou and Ref.Tem. The method of this invention for calculating partition functions is significantly different from the methods proposed in those references. Ref.Woc and Ref.Pou use a sequence of $\beta$ values, whereas this invention doesn't. Ref.Pou and Ref.Tem propose building a state $\rho = e^{-\beta H}/Z$, whereas this invention doesn't.

The inventor Tucci first published a description of this invention on Dec. 22, 2010, in Ref.TucZ. Later, he added further details in Ref.TucQOA.

BRIEF SUMMARY OF THE INVENTION

A preferred embodiment of the invention is QOperAv, a computer program written in Java. Source code for QOperAv1.5 is included with this patent. QOperAv is a "code generator" for generating quantum circuits. The quantum circuits generated by QOperAv can be used to evaluate certain quantum operator averages.

DETAILED DESCRIPTION OF THE INVENTION

This section describes in detail a preferred embodiment of the invention called QOperAv and other possible embodiments of the invention.

A preferred embodiment of the invention is QOperAv, a computer program written in Java. Source code for QOperAv1.5 is included with this patent. QOperAv is a "code generator" for generating quantum circuits. The quantum circuits generated by QOperAv can be used to evaluate certain quantum operator averages.

Figure 1:
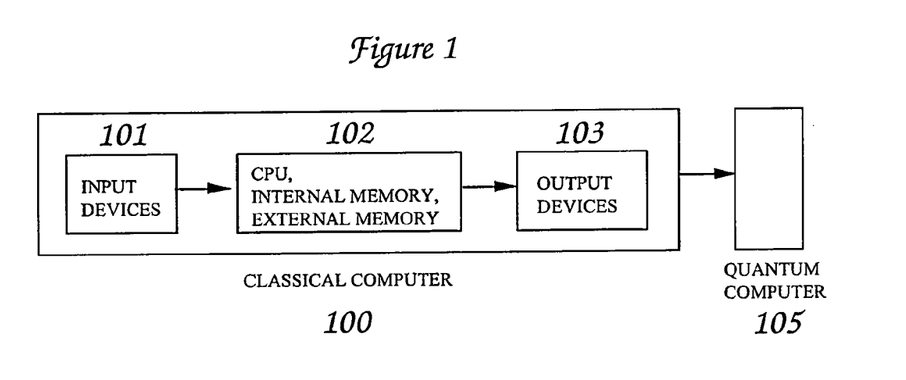
FIG. 1 shows a block diagram of a classical computer feeding data to a quantum computer.

FIG. 1 is a block diagram of a classical computer feeding data to a quantum computer. Box 100 represents a classical computer. QOperAv1.5 software runs inside Box 100. Box 100 comprises sub-boxes 101, 102, 103. Box 101 represents input devices, such as a mouse or a keyboard. Box 102 comprises the CPU, internal and external memory units. Box 102 does calculations and stores information. Box 103 represents output devices, such as a printer or a display screen. Box 105 represents a quantum computer, comprising an array of quantum bits and some hardware for manipulating the state of those bits.

The remainder of this section is divided into 4 subsections. Subsection (A) describes the quantum circuit generated by QOperAv. Subsection (B) describes QOperAv's user interface. Subsection (C) discusses possible uses of the invention. Subsection (D) discusses other possible embodiments of the invention.

(A) QOperAv: Quantum Circuit

In this section, we describe the quantum circuit generated by QOperAv. For a more detailed description of the circuit, see Ref.TucZ.

Figure 2:
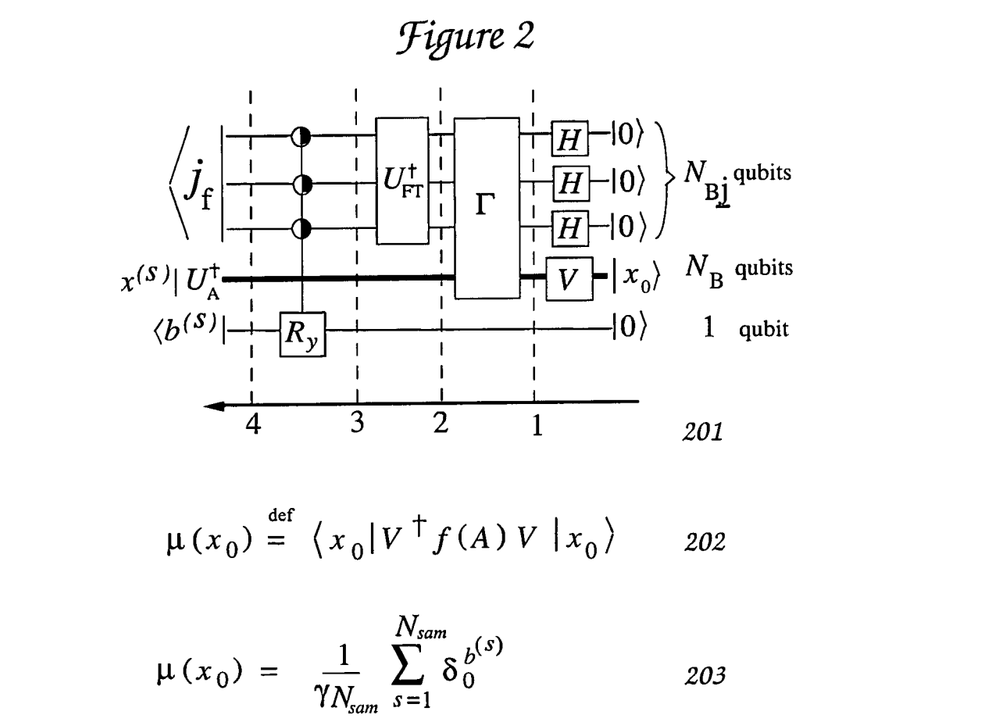
FIG. 2 shows the quantum circuit generated by QOperAv.

201 in FIG. 2 is the quantum circuit generated by QOperAv. Let $N_B$ and $N_{Bj}$ be positive integers, and let $x_0$ be an element of $\{0, 1\}^{N_B}$. Circuit 201 operates on $N_B+N_{Bj}+1$ qubits. Henceforth, we will refer to the top $N_B$ qubits as the probe qubits, to the middle $N_{Bj}$ qubits as the atom qubits, and to the single bottom qubit as the ancilla qubit.

Circuit 201 starts off in an initial state which is a tensor product state of all the qubits, with the probe qubits in state $|0\rangle$, the atom qubits in state $|x_0\rangle$, and the ancilla qubit in state $|0\rangle$. This initial state is then subjected to various operators. We will next proceed to describe the nature of each of these operators. Note that the arrow at the bottom of circuit 201 indicates the direction in which time flows, and various specific times labeled 1 to 4.

Time 1 occurs immediately after applying to the initial quantum state a single-qubit Hadamard operator H to each of the probe qubits, and the unitary operator V to the atom qubits. The user of QOperAv provides a circuit for V as input.

Time 2 occurs immediately after applying the unitary operator Γ to the probe and atom qubits. The insides of Γ will be described later.

Time 3 occurs immediately after applying to the probe qubits, the Hermitian conjugate of the well-known quantum Fourier transform operator $U_{FT}$.

Time 4 occurs immediately after applying what we call in this patent a "quantum multiplexor" to the probe and ancilla qubits. The insides of this quantum multiplexor will be described later.

Equation 202 defines a quantity $\mu(x_0)$. Equation 203 gives a way of calculating $\mu(x_0)$ by repeatedly making a certain type of measurement on the circuit 201 at time 4. We call the number of repetitions $N_{sam}$, ("sam" stands for "samples"). The binary numbers $b^{(s)}$ for $s=1, 2, \ldots, N_{sam}$ are the outcomes of the measurement of the ancilla qubit, and $\gamma$ is a positive real number about which we will say more later.

Figure 3:
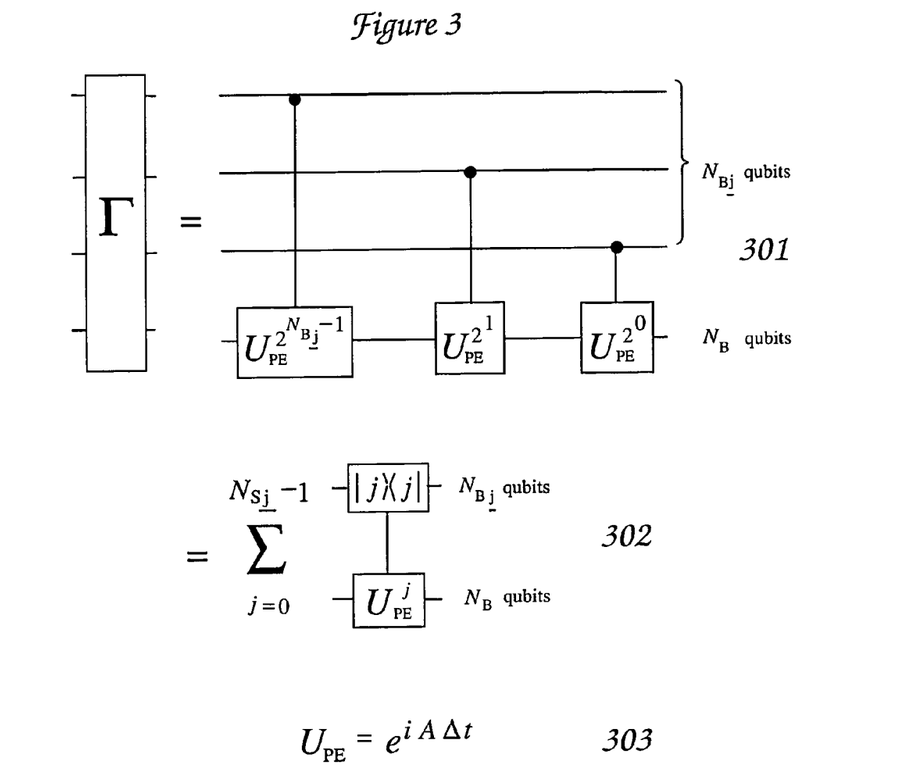
FIG. 3 shows insides of certain parts of the circuit of FIG. 2. In particular, it shows operator Γ, which is part of the phase estimation algorithm.

Equations 301 and 302 of FIG. 3 define in two equivalent ways the operator $\Gamma$ in FIG. 2. $\Gamma$ acts on the probe and atom qubits. Equations 301 and 302 allude to an operator $U_{PE}$. Equation 303 defines the unitary operator $U_{PE}$ in terms of a Hermitian operator A and a positive real number $\Delta t$. ("PE" stands for "phase estimation"). All operations between the initial state and time 3 constitute the so called "quantum phase estimation" algorithm (first proposed by Kitaev in Ref.Kit).

Figure 4:
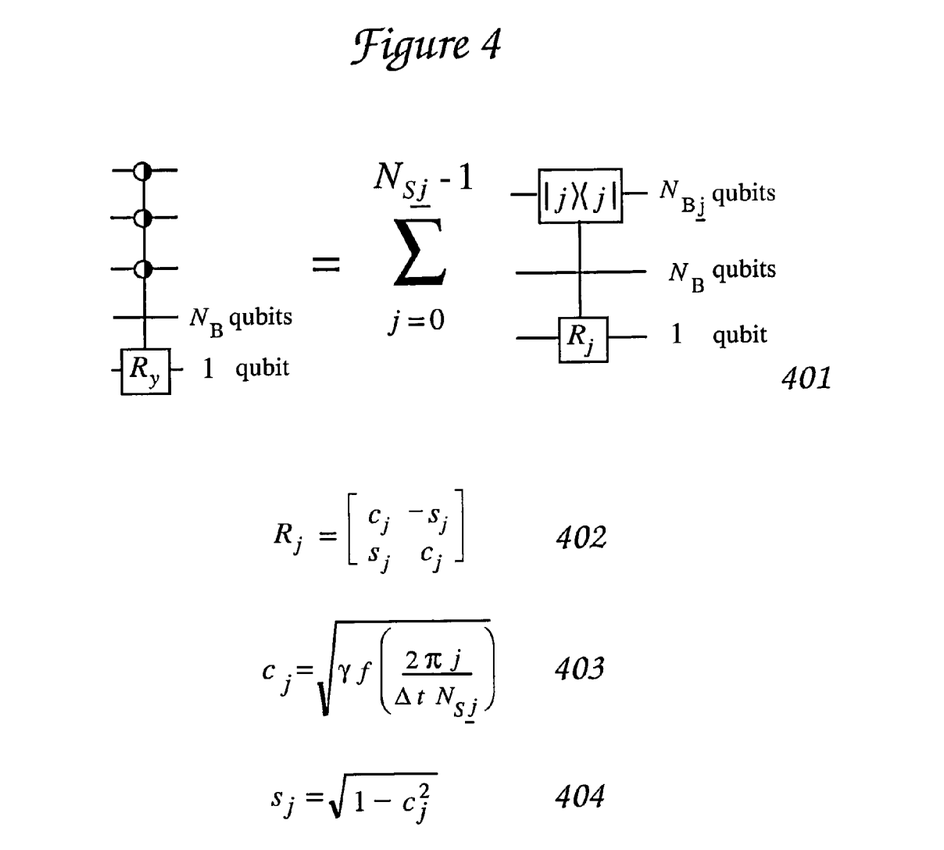
FIG. 4 shows insides of certain parts of the circuit of FIG. 2. In particular, it shows the quantum multiplexor step.

Equation 401 of FIG. 4 shows the quantum multiplexor of FIG. 2. Quantum multiplexors have been discussed by Tucci, for instance, in Ref.TucQuSann. Quantum multiplexors have a target qubit and a set of control qubits. In the case of FIG. 2, the target of the multiplexor is the ancilla qubit and its controls are the probe qubits. Equation 401 alludes to an operator $R_j$. Equations 402, 403 and 404 jointly define the 2-dim rotation $R_j$. In equation 403, $f(\ )$ is a function from the reals (or perhaps from just a subset of the reals) to the reals and $\gamma$ is a positive real.

Let $N_S = 2^{N_B}$ and $N_{Sj} = 2^{N_{Bj}}$. The Hermitian operator A is assumed to have non-negative eigenvalues. (Given any Hermitian operator A whose eigenvalues are bounded below, we can shift A by an appropriate constant so that its new eigenvalues are non-negative.) Furthermore, $\Delta t$ is assumed to be small enough that $$A_x \frac{\Delta t}{2\pi} < \frac{N_{S_j} - 1}{N_{S_j}}$$

for all eigenvalues $A_x$ of A. Furthermore, we assume that $$0 \leq \gamma f\left(\frac{2\pi j}{\Delta t N_{S_j}}\right) \leq 1$$

for $j=0, 1, 2, \ldots, N_{Sj}-1$.

(B) QOperAv: User Interface

In this section, we describe QOperAv's user interface. For a more detailed description of the interface, see Ref.TucQOA.

(B1) Input Parameters

QOperAv expects the following inputs:

$N_B$ $N_{Bj}$ $\gamma$ $\Delta t$ for $p=0, 1, 2, \ldots, N_{Bj}-1$, a quantum circuit for exp $(i2^P A\Delta T)$: We call the unitary operator $\exp(iA\Delta t)$ an "atom" and the $N_B$ qubits it acts on, the atom qubits. The demonstration version of QOperAv uses as an atom the circuit for an $N_B$-qubit quantum Fourier transform, and it raises the atom to the $2^P$-th power by placing the atom inside a LOOP that repeats $2^P$ times, but both this particular atom and this method of raising the atom to a power can be changed easily by subclassing the class of QOperAv that defines this. In particular, rather than raising the atom to a power by repeating the atom circuit, the user could raise the atom to the $2^P$-th power by replacing the parameter $\Delta t$ by $2^P \Delta t$ in the atom circuit.

a quantum circuit for V: The unitary operator V acts on the atom qubits. The demonstration version of QOperAv uses for V the circuit for an $N_B$-qubit quantum Fourier transform, but this can be changed easily by subclassing the class of QOperAv that defines this.

function $f$: The demonstration version of QOperAv uses $f(\xi) = e^{-(0.1)\xi}$, but this can be changed easily by subclassing the class of QOperAv that defines this.

(B2) Output Files

QOperAv outputs 3 types of files: a Log File, an English File and a Picture File.

A Log File records all the data (inputs and outputs) in the Control Panel (see FIG. 5), so the user won't forget it.

An English File gives an "in English" description of a quantum circuit. It completely specifies the output SEO. Each line in it represents one elementary operation, and time increases as we move downwards in the file.

A Picture File gives an ASCII picture of the quantum circuit. It partially specifies the output SEO. Each line in it represents one elementary operation, and time increases as we move downwards in the file. There is a one-to-one onto correspondence between the rows of corresponding English and Picture Files.

See Ref.TucQuibbs for a detailed description of the content of English and Picture files and how to interpret that content.

(B3) Control Window

Figure 5:
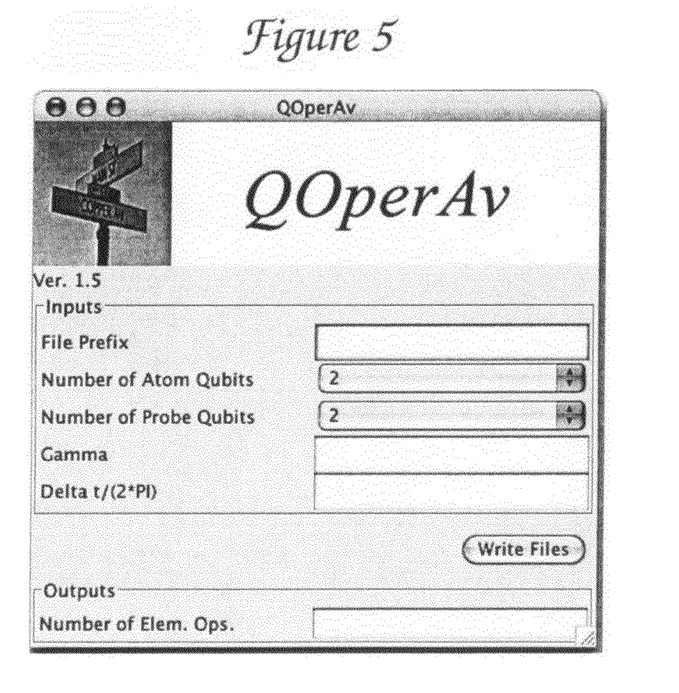
FIG. 5 shows Control Panel of QOperAv.

FIG. 5 shows the Control Panel for QOperAv. This is the main and only window of QOperAv (except for the occasional error message window). This window is open if and only if QOperAv is running. The Control Panel allows the user to enter the following inputs:

File Prefix: Prefix to the 3 output files that are written when the user presses the Write Files button. For example, if the user inserts test in this text field, the following 3 files will be written:

test_qoa_log.txt This is a Log File.

test_qoa_eng.txt This is an English File test_qoa_pic.txt This is a Picture File.

Number of Atom Qubits: This equals $N_B$.

Number of Probe Qubits: This equals $N_{Bj}$.

gamma: This equals $\gamma$.

Delta t/(2*PI): This equals $\Delta t/(2\pi)$.

The Control Panel displays the following output text boxes.

Number of Elementary Operations: This is the number of elementary operations in the output quantum circuit. If there are no LOOPs, this is the number of lines in the English File, which equals the number of lines in the Picture File. If there are loops, the inner part of the loops is counted as many times as the loop is repeated.

(C) Possible Uses

In this section, we describe some possible uses of the invention.

Figure 6:
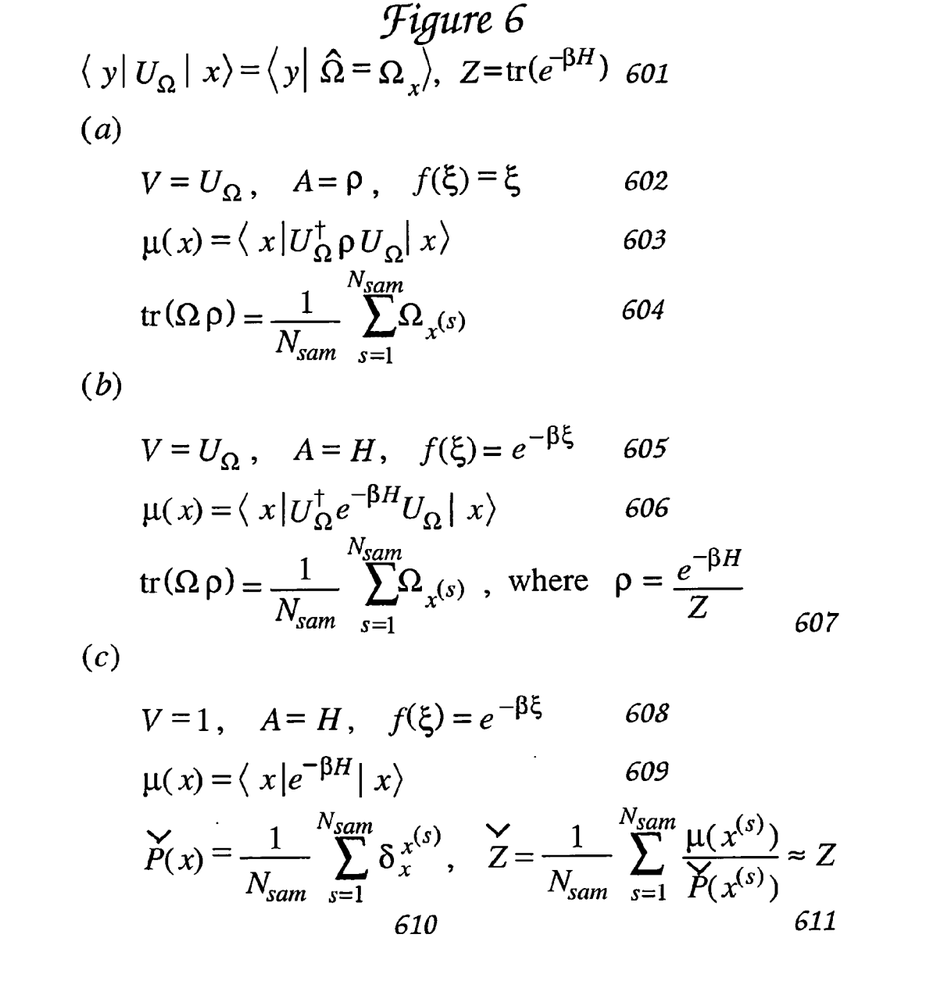
FIG. 6 shows various scenarios for which the circuit of FIG. 2 is useful.

FIG. 6 points out 3 possible scenarios, labeled (a), (b) and (c), in which this invention could be used. Those experienced in the art might come up with other possible scenarios or modifications of the scenarios discussed here.

Throughout this section, assume x and y are elements of $\{0, 1\}^{N_B}$. Let $\hat{\Omega}$ be a Hermitian operator acting on $N_B$ qubits. Let $\Omega_x$ for all x represent the eigenvalues of $\hat{\Omega}$. Assume that we have at our disposal some PD (probability distribution) sampler that allows us to obtain samples $x^{(s)}$ for s=1, 2, ..., $N_{sam}$ of the non-negative function $\mu(x)$. It's not necessary that $\Sigma_x \mu(x)=1$.

The PD-sampler can be a classical or a quantum device or a hybrid of these two types of devices. An example of a PD-Sampler that runs exclusively on a classical computer is the famous computer program WinBugs (discussed in Ref.WikiWBugs). An example of a PD-sampler that would use a quantum computer is the one proposed in Ref.TucQuibbs.

Equation 601 defines the "basis-changer" unitary operator $U_\Omega$ and a partition function Z.

For scenario (a), replace the V, A and $f(\ )$ in equation 202 by those given in line 602. This gives equation 603 for $\mu(x)$. We can use the PD-sampler to sample this $\mu(x)$ that is calculated by QOperAv. This procedure and equation 604 can be used to estimate $tr(\Omega\rho)$.

For scenario (b), replace the V, A and $f(\ )$ in equation 202 (where $\beta$ is some positive number) by those given in line 605. This gives equation 606 for $\mu(x)$. We can use the PD-sampler to sample this $\mu(x)$ that is calculated by QOperAv. This procedure and equation 607 can be used to estimate $tr(\Omega\rho)$, where $\rho$ is the density matrix proportional to $e^{-\beta H}$.

For scenario (c), replace the V, A and $f(\ )$ in equation 202 (where $\beta$ is some positive number) by those given in line 608. This gives equation 609 for $\mu(x)$. We can use the PD-sampler to sample this $\mu(x)$ that is calculated by QOperAv. This procedure and equations 610, 611 can be used to obtain an estimate of the partition function Z.

(D) Other Embodiments

In this section, we describe other possible embodiments of the invention.

Some conditions which are not necessary for the operation of QOperAv or other embodiments of this invention, but which would be advantageous if they were satisfied, are as follows. The conditions are that the function $f(\ )$ be simple (that is, that it be calculable with polynomial efficiency), and that the operators V and $\exp(i2^p A\Delta t)$ be compilable with polynomial efficiency (that is, that they can be expanded into a SEO whose length scales polynomially in the number of atom qubits).

Of course, QOperAv could have been written in a computer language other than Java.

The quantum circuit generated by QOperAv includes some quantum multiplexors. The Java application Multiplexor Expander (see Ref.TucQusann) allows the user to replace each of those multiplexors by a sequence of more elementary gates such as multiply controlled NOTs and qubit rotations. Multiplexor Expander source code is included with this patent. Another perhaps more efficient variation would be if QOperAv didn't write a given multiplexor in the English File, but rather wrote instead a SEO that was either exactly or approximately equal to the multiplexor.

The quantum circuit generated by QOperAv and Multiplexor Expander may include some multiply controlled NOTs. The Java application MultiCNot Expander, whose source code is included with this patent, allows the user to replace each of those multiply controlled NOTs by a sequence of more elementary gates such as singly controlled NOTs and qubit rotations.

A version of QOperAv could forgo writing the English or Picture Files and feed the SEO directly to the quantum computer.

So far, we have described some exemplary preferred embodiments of this invention. Those skilled in the art will be able to come up with many modifications to the given embodiments without departing from the present invention. Thus, the inventor wishes that the scope of this invention be determined by the appended claims and their legal equivalents, rather than by the given embodiments.

I claim:

1. A method of operating a classical computer to calculate a total SEO (Sequence of Elementary Operations) represented by a quantum circuit, wherein an elementary operation acts on one, two, or three qubits at a time, wherein said total SEO depends on a positive real number $\Delta t$, a unitary operator V, a Hermitian operator A, and a function $f(\ )$ wherein said total SEO acts on $N_{Bj}$ atom qubits, $N_B$ probe qubits, and one ancilla qubit, wherein said total SEO is calculated for applying said total SEO to a quantum computer to induce said quantum computer to yield readings that facilitate the calculation of an estimate of the quantity $\mu(x_0)$ equal to $\langle x_0|V^\dagger f(A)V|x_0\rangle$ for a predetermined point $x_0$ in $\{0, 1\}^{N_B}$, said method comprising the steps of:

storing in said classical computer:
a V-SEO that approximates the unitary operator V,
a pth-SEO that approximates $\exp(i2^p A\Delta t)$ for each $p\in\{0, 1, ..., N_{Bj}-1\}$, calculating using said classical computer, a phase-estimation-SEO that encodes information about the eigenvalues of A into the state of said probe qubits, said phase-estimation-SEO comprising:
for each probe qubit $\beta$, said pth-SEO for some $p\in\{0, 1, ..., N_{Bj}-1\}$, wherein said pth-SEO acts on the atom qubits and is applied depending on the state of said probe qubit $\beta$;
a SEO approximating the quantum Fourier operator or the Hermitian conjugate thereof acting on the probe qubits;

calculating using said classical computer, a multiplexor-SEO, wherein said multiplexor-SEO is a SEO which approximately equals a quantum multiplexor operator whose controls are said probe qubits and whose target is said ancilla qubit, wherein the parameters of said quantum multiplexor operator depend on said function $f(\ )$, said multiplexor-SEO comprising:
a 2-dimensional rotation $$R_j = \begin{bmatrix} c_j & -s_j \\ s_j & c_j \end{bmatrix}, c_j = \sqrt{\gamma f\left(\frac{2\pi j}{\Delta t N_{S_j}}\right)}, s_j = \sqrt{1-c_j^2},$$

where $\gamma$ is a positive real value and $N_{Sj}=2^{N_{Bj}}$;
outputting said total SEO;
wherein said total SEO contains said V-SEO, said phase-estimation-SEO, and said multiplexor-SEO.

2. The method of claim 1, wherein said multiplexor-SEO is an exact expansion which is exactly equal to said quantum multiplexor operator, wherein said exact expansion uses only 1-qubit and 2-qubit elementary operations, and uses a number of 2-qubit operations less than $2^c+1$, where c is the number of controls of said quantum multiplexor operator.

3. The method of claim 1, wherein said multiplexor-SEO is an oracular approximation expansion of said quantum multiplexor operator.

4. The method of claim 1, wherein every elementary operation of said multiplexor-SEO acts on less than 3 qubits, wherein said multiplexor-SEO has a number of 2-qubit operations less than $2^c+1$, where c is the number of said probe qubits.

5. The method of claim 1, wherein V equals a basis changer unitary operator $U_\Omega$ for a Hermitian operator $\Omega$, A equals a density matrix $\rho$, and $f(\xi)=\xi$.

6. The method of claim 5, also utilizing a PD-sampler, comprising the additional steps of
using said PD-sampler to obtain a set of points x distributed according to $\mu(x)$,
using said set of points to estimate $\text{tr}(\Omega\rho)$.

7. The method of claim 1, wherein V equals a basis changer unitary operator $U_\Omega$, A equals a Hermitian operator H, and $f(\xi)=e^{-\beta\xi}$ for some predetermined real number $\beta$.

8. The method of claim 7, also utilizing a PD-sampler, comprising the additional steps of
using said PD-sampler to obtain a set of points x distributed according to $\mu(x)$,
using said set of points to estimate $\text{tr}(\Omega\rho)$, where $\rho$ is the density matrix proportional to $e^{-\beta H}$.

9. The method of claim 1, wherein V=1, A equals a Hermitian operator H, and $f(\xi)=e^{-\beta\xi}$ for some predetermined real number $\beta$.

10. The method of claim 9, also utilizing a PD-sampler, comprising the additional steps of
using said PD-sampler to obtain a set of points x distributed according to $\mu(x)$,
using said set of points to estimate $Z=\text{tr}(e^{-\beta H})$.

11. A device that calculates a total SEO (Sequence of Elementary Operations) represented by a quantum circuit, wherein an elementary operation acts on one, two, or three qubits at a time, wherein said total SEO depends on a positive real number $\Delta t$, a unitary operator V, a Hermitian operator A, and a function $f(\ )$, wherein said total SEO acts on $N_{Bj}$ atom qubits, $N_B$ probe qubits, and one ancilla qubit, wherein said total SEO is calculated for applying said total SEO to a quantum computer to induce said quantum computer to yield readings that facilitate the calculation of an estimate of the quantity $\mu(x_0)$ equal to $\langle x_0|V^\dagger f(A)V|x_0\rangle$ for a predetermined point $x_0$ in $\{0, 1\}^{N_B}$, said device comprising:
a memory arranged to store:
a V-SEO that approximates the unitary operator V,
a pth-SEO that approximates $\exp(i2^p A\Delta t)$ for each $p\in\{0, 1, \ldots, N_{Bj}-1\}$,
a processor arranged to calculate a phase-estimation-SEO that encodes information about the eigenvalues of A into the state of said probe qubits, said phase-estimation-SEO comprising:
for each probe qubit $\beta$, said pth-SEO for some $p\in\{0, 1, \ldots, N_{Bj}-1\}$, wherein said pth-SEO acts on the atom qubits and is applied depending on the state of said probe qubit $\beta$;
a SEO approximating the quantum Fourier operator or the Hermitian conjugate thereof acting on the probe qubits;
said processor further arranged to calculate a multiplexor-SEO, wherein said multiplexor-SEO is a SEO which approximately equals a quantum multiplexor operator whose controls are said probe qubits and whose target is said ancilla qubit, wherein the parameters of said quantum multiplexor operator depend on said function $f(\ )$
said multiplexor-SEO comprising:
a 2-dimensional rotation $$R_j = \begin{bmatrix} c_j & -s_j \\ s_j & c_j \end{bmatrix}, c_j = \sqrt{\gamma f\left(\frac{2\pi j}{\Delta t N_{S_j}}\right)}, s_j = \sqrt{1-c_j^2},$$

where $\gamma$ is a positive real value and $N_{Sj}=2^{N_{Bj}}$;
outputting said total SEO;
wherein said total SEO contains said V-SEO, said phase-estimation-SEO, and said multiplexor-SEO.

12. The device of claim 11, wherein said multiplexor-SEO is an exact expansion which is exactly equal to said quantum multiplexor operator, wherein said exact expansion uses only 1-qubit and 2-qubit elementary operations, and uses a number of 2-qubit operations less than $2^c+1$, where c is the number of controls of said quantum multiplexor operator.

13. The device of claim 11, wherein said multiplexor-SEO is an oracular approximation expansion of said quantum multiplexor operator.

14. The device of claim 11, wherein every elementary operation of said multiplexor-SEO acts on less than 3 qubits, wherein said multiplexor-SEO has a number of 2-qubit operations less than $2^c+1$, where c is the number of said probe qubits.

15. The device of claim 11, wherein V equals a basis changer unitary operator $U_\Omega$ for a Hermitian operator $\Omega$, A equals a density matrix $\rho$, and $f(\xi)=\xi$.

16. The device of claim 15, further comprising:
a PD-sampler that yields a set of points x distributed according to $\mu(x)$,
a processor arranged to use said set of points to calculate an estimate of $\text{tr}(\Omega\rho)$.

17. The device of claim 11, wherein V equals a basis changer unitary operator $U_\Omega$, A equals a Hermitian operator H, and $f(\xi)=e^{-\beta\xi}$ for some predetermined real number $\beta$.

18. The device of claim 17, further comprising:
a PD-sampler that yields a set of points x distributed according to $\mu(x)$,
a processor arranged to use said set of points to calculate an estimate of $\text{tr}(\Omega\rho)$,
where $\rho$ is the density matrix proportional to $e^{-\beta H}$.

19. The device of claim 11, wherein V=1, A equals a Hermitian operator H, and $f(\xi)=e^{-\beta\xi}$ for some predetermined real number $\beta$.

20. The device of claim 19, further comprising:
a PD-sampler that yields a set of points x distributed according to $\mu(x)$,
a processor arranged to use said set of points to calculate an estimate of $Z=\text{tr}(e^{-\beta H})$.

* * * * *